United States Patent [19]

Talbot

[11] 4,130,943

[45] Dec. 26, 1978

[54] EXTENSION LEVEL

[76] Inventor: Claude J. Talbot, Paincourtville, La. 70391

[21] Appl. No.: 818,239

[22] Filed: Jul. 22, 1977

[51] Int. Cl.$^2$ .......... G01C 9/34

[52] U.S. Cl. .......... 33/374

[58] Field of Search .......... 33/374

[56] References Cited

U.S. PATENT DOCUMENTS

| | | | |
|---|---|---|---|
| 686,360 | 11/1901 | Smiddy et al. | 33/374 |
| 2,879,606 | 3/1959 | Olivere | 33/374 |
| 3,104,477 | 9/1963 | Edwill | 33/374 |
| 3,243,888 | 4/1966 | Redding | 33/374 |

*Primary Examiner*—Charles E. Phillips
*Attorney, Agent, or Firm*—LeBlanc & Shur

[57] ABSTRACT

A carpenter's level extendable preferably from a length of 24 inches to a length of 48 inches in six-inch increments is described. The level includes an I-beam shaped base section with right and left extension members slidably mounted thereon. Said extension members engage either side of the base at tracks formed by the side extensions of the I. The extension sections are independently movable relative to the base and to each other, and a locking mechanism is carried by each extension section to lock said section against lateral movement in a predetermined extension position. Each extension section carries a conventional tubular spirit level vial in an aperture and a third vial is centrally located in an aperture through the base section. Each extension section and the base section also has apertures therethrough spaced on, for example, six-inch centers for visible observation of each vial whether the members are extended or collapsed. A longitudinal ridge is provided on the upper and lower surfaces of the base section, the surface of which, with the upper and lower surfaces of the extension section, forms a continuous leveling and plumbing surface.

10 Claims, 11 Drawing Figures

FIG II
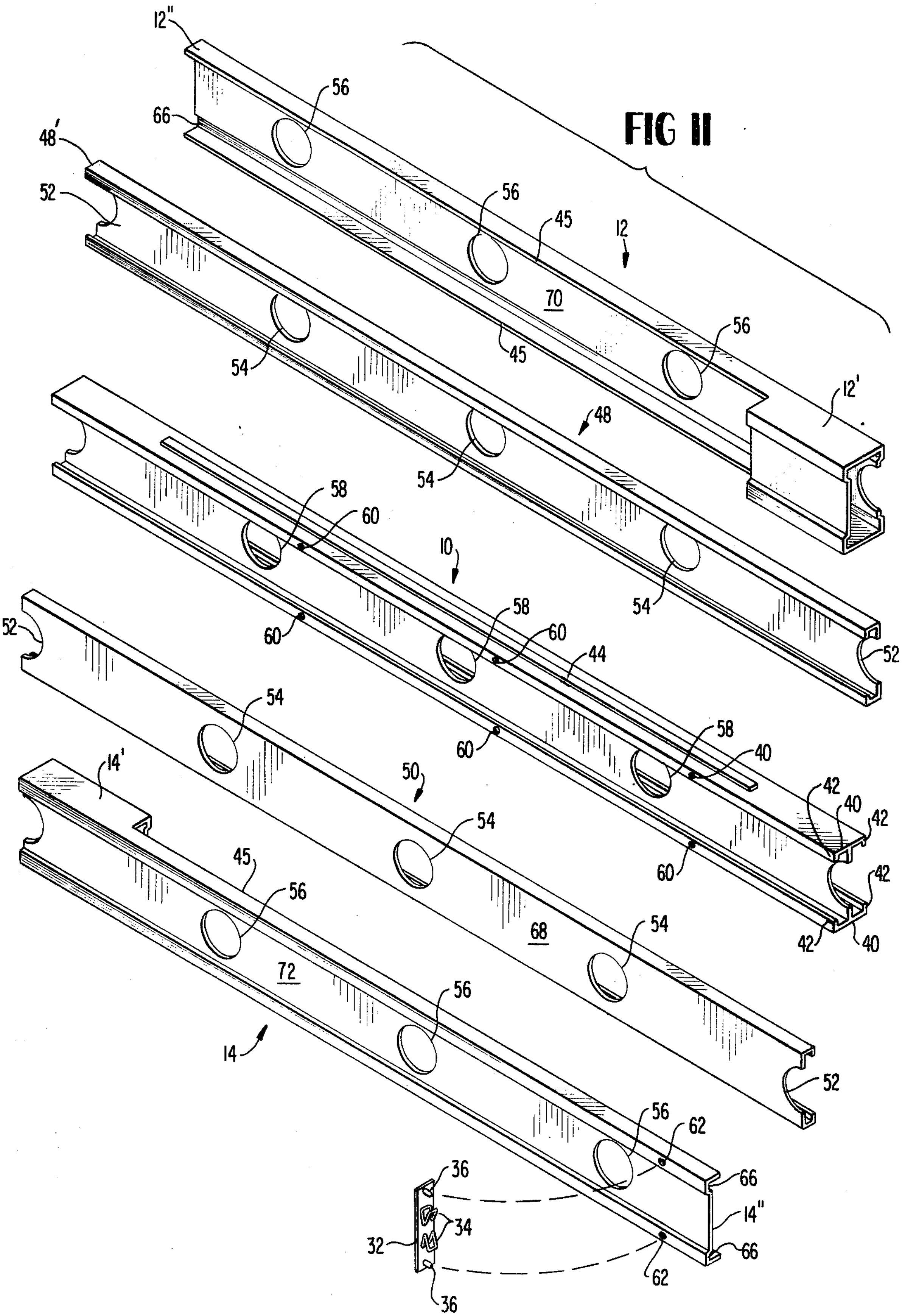

EXTENSION LEVEL

This invention relates to a carpenter's level, and in particular to a level which may be extended from a size small enough to fit in a tool kit up to a length of, for example, 48 inches without loss of stability or accuracy.

Extendable levels are known in the prior art. See for example, U.S. Pat. Nos. 1,544,153 and 2,057,404. Prior extendable levels, however, were complicated devices, as shown in the aforementioned patents, bulky, and expensive to manufacture. Accordingly, a need has existed for many years for providing a carpenter's level that is easy to use, inexpensive, but still accurate and reliable.

As will be obvious to those skilled in the art, general carpentry work requires the use of carpenter's levels which are 36 to 48 inches in length on many occasions. In other instances, especially in the case of confined areas, a much shorter carpenter's level would be adequate or necessary. In the absence of a dependable extendable level, it is often necessary to have at least two levels of differing lengths at a particular job. In addition, a level 36 to 48 inches in length is unwieldy to carry or store.

It has been discovered, however, that an accurate and dependable extendable level can be provided according to this invention which may be extended from a length of preferably 24 inches up to a length of 48 inches in increments. The level of this invention also may be fully utilized at any incremental length because the spirit level vials mounted therein are visible at any extended length. In other words, extension of the level of this invention from a closed position to any extended position desired does not change the effectiveness of the device, due to its unique design.

Furthermore, the level of this invention mounts extendable arms in self-retaining tracks for stability whereby even in the ultimate extension position the device will be stable against wobble or other movement between relative parts.

Accordingly, it is an object of this invention to provide an extendable level which may be collapsed to a length small enough to fit into a standard tool box.

It is another object of this invention to provide a level that may be extended in increments between a collapsed position and a fully open position.

It is another object of this invention to provide an extendable level wherein all spirit level vials are fully exposed to view at any incremental position of the level from a fully collapsed position to a fully extended position.

It is still another object of this invention to provide an extendable level having extension arms slidably mounted on tracks integral with a base so that said level in an extended position will be stable against relative movements of the respective parts thereof.

It is yet another object of this invention to provide a level extendable in increments between a fully collapsed position and a fully extended position which may be locked at preselected intervals or at a fully collapsed or fully extended position against lateral relative movement of the component parts thereof.

These and other objects will become readily apparent with reference to the drawings and following description wherein:

FIG. 11 is an exploded view of the device of this invention illustrating the positioning of a locking mechanism.

Figures 1, 2, 3, 4, 5, 6, 7, 8, 9, 10:
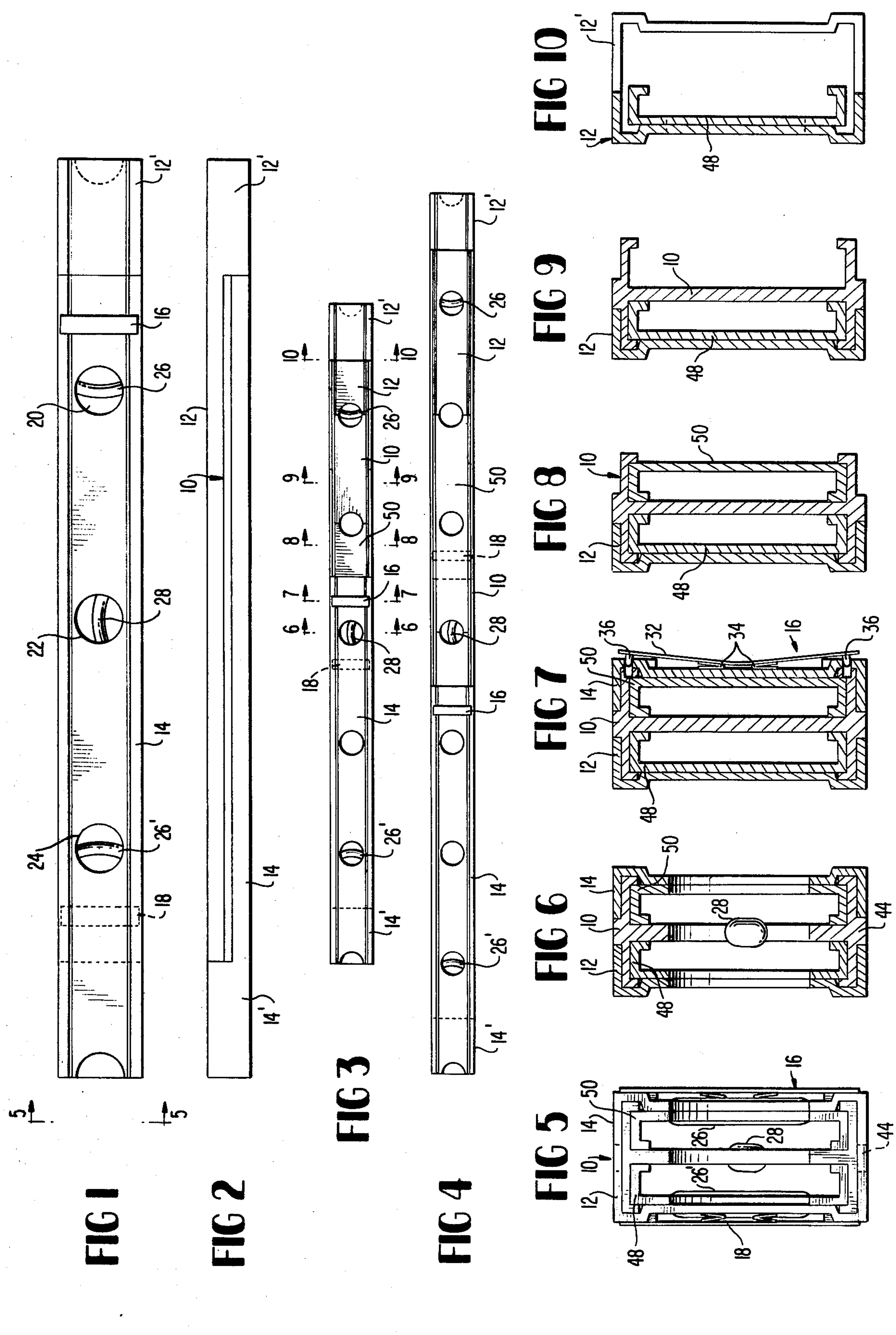
FIG. 1 is a side view of the device of this invention fully collapsed.
FIG. 2 is a top view of the device of this invention fully collapsed as shown in FIG. 1.
FIG. 3 is a side view of the device of this invention partially extended.
FIG. 4 is a side view of the device of this invention fully extended.
FIG. 5 is a cross sectional view taken along line 5—5 of FIG. 1.
FIG. 6 is a cross-sectional view taken along line 6—6 of FIG. 3.
FIG. 7 is a cross-sectional view taken along line 7—7 of FIG. 3 showing the locking depressed.
FIG. 8 is a cross-sectional view taken along line 8—8 of FIG. 3.
FIG. 9 is a cross-sectional view taken along line 9—9 of FIG. 3.
FIG. 10 is a cross-sectional view taken along line 10—10 of FIG. 3.

With reference to FIGS. 1 and 2, the device of this invention comprises a centrally located base member 10 and mating extension members 12 and 14 mounted thereon. Each extension member mounts a respective locking assembly 16 and 18. As shown in FIG. 2, extension members 12 and 14 have integral terminal block members 12' and 14', respectively.

In the collapsed position of FIGS. 1 and 2, the device of this invention defines three apertures 20, 22 and 24 which extend through members 10, 12 and 14 and are mutually spaced with preferably six inches between centers of adjacent apertures. Apertures 20 and 24 mount plumbing vials which are conventional tubular spirit level vials 26 and 26' and aperture 22 mounts a leveling vial 28.

With reference to FIG. 5, plumbing vial 26 is carried by extension member 14. Plumbing vial 26' is carried by extension member 12. Finally, centering vial 28 is carried by the center base section 10.

With reference to FIGS. 5 and 7, the preferred locking mechanism 16 and 18 consists of a leaf-spring 32 supported by biasing members 34. The end portions of spring 32 mount pins 36 which normally pass through aligned holes in member 14 to engage corresponding holes in member 10. As will be obvious to those skilled in the art, springs 16 and 18 are of identical construction.

In the collapsed position of FIGS. 1 and 2, the end block portions 12' and 14' of extendable members 12 and 14, respectively, house the end portions of the center base member 10 and the end portion of the opposite extendable member. Accordingly, block portion 12' encloses an end of member 10 and the end of member 14 opposite block member 14'. Block member 14', in turn, encloses the opposite end of member 10 and the end of member 12 opposite block portion 12'.

With reference to FIG. 11, the center base section 10 comprises an I-beam shape in cross section with L-shaped leg portions of the I 40 forming tracks at the terminal portions thereof 42. A guide means in the form of opposed ridges 44 extends longitudinally substantially the length of member 10 which ridges abut the edges 45 of members 12 and 14 to insure stability. Ridges 44 then extend substantially the length of the plumbing and leveling surfaces of the device of this invention, and as shown, in the cross-sectional views FIGS. 5-9, extends along both longitudinal surfaces of base member 10.

Each extendable member 12 and 14 mounts channel spacer member 48 and 50, respectively. Both channel members 48 and 50, and extendable members 12 and 14 have apertures disposed therethrough which are aligned for visual access. When the device of this invention is assembled, the end portion of member 14, 14″ abuts the interior face of block 12′ and the corresponding end portion 12″ abuts the corresponding interior face of block 14′. In assembly, member 48 has an end 48′ which extends beyond the end 12″ a distance sufficient to extend through block 14′ when the device is collapsed. Correspondingly, when channel member 50 is mounted on member 14, channel member 50 extends beyond end 14″ a distance sufficient to extend through block 12′. The opposite ends then of channel members 48 and 50 extend through blocks 12′ and 14′. Half circles 52 are formed at each end of members 48 and 50 so that when the device is extended, the end of the member will not obscure an aperture used for viewing the vial mounted therein.

In a preferred version of this invention, half circles 52, and apertures 54 in members 48 and 50 as well as apertures 56 in members 12 and 14, and apertures 48 in base member 10 are all mutually spaced with centers six inches apart. Holes 60 are aligned in member 10 whereby the locking device either 16 or 18 may urge pins 36 through holes 62 in member 14 as shown in FIG. 11 to engage hole 60 as also shown, for example, in FIG. 7 and retain said extendable member in a predetermined position relative to member 10. A corresponding locking device with appropriate holes is carried in member 12 and said holes are formed in member 10 corresponding to holes 60 but on the opposite side thereof (not shown). Members 12 and 14 are formed to define longitudinally extending shoulders 66 which extend the length thereof, which shoulders receive the tracks 42 of member 10 as shown in FIGS. 5-9. Members 48 and 50 serve as spacer members having a face thereof 68 normally disposed abutting the face of members 12 and 14, 70 and 72, respectively, which extends laterally between shoulders 66.

As will be obvious to those skilled in the art, members 14 and 50 and members 12 and 48 may be formed integrally, or formed separately and joined by appropriate well-known connecting means such as glue or the like. Accordingly, members 12 and 48, and 14 and 50 act in combination to enclose the L-shaped extension ends 42 of member 10 in a slidable relationship. The action of locking means 16 and 18 with holes 60 and 62 as shown in FIG. 11, merely locks the device of this invention in a predetermined position relative to the slidable parts thereof, and spacing of the individual locking holes also insures visual observation of the vials carried by this device when the locking device engages a pair of holes 60 in member 10.

If the device of this invention is intended to expand from a collapsed length of 24 inches to a fully extended length of 48 inches, and if each of the apertures and half-circles therein are initially separated by a distance of six inches between centers, then the configuration of FIGS. 3 and 4 would result in an extension length of 36 inches and 48 inches, respectively.

In both FIGS. 3 and 4, the base member 10 is exposed whereas in FIGS. 1 and 2, the collapsed form, the base member is fully enclosed by the extendable members 12 and 14. Furthermore, the end of member 50 opposite block member 14′ is shown in an overlying relationship over center support member 10.

Preferably, as shown in FIG. 4, the fully extended model maintains an overlap of the extendable members with the center section such that the half-circle end portions 52 of members 48 and 50 encircle the center aperture 22 which mounts the vial 28. In this way, full stability will be maintained through the action of members 14 and 50 and 12 and 48 respectively in enclosing the track members 42 and through edge 45 of each member 12 and 14, respectively, in abutting the center longitudinal ridge 44 of member 10.

In summary, then, this invention relates to an extendable level which will maintain stability at a variety of lengths from a length short enough to be contained within a standard toolbox up to 36 or 48 inches, as desired. The device comprises a center I-shaped base member forming pairs of tracks on opposing faces, and extendable members slidably receiving said tracks, one member on either side thereof. A locking device, preferably a leaf-spring mounted pair of pins, is utilized to connect the extendable member and the base member against lateral movement, and said locking device is positioned so that when said device is locked, levelling and plumbling vials mounted by said device are visible through apertures common to one or more of said extendable members and said base member. The length of the instant device may be changed as desired from, for example, 24 inches at six inch intervals to 48 inches, or any desired length depending upon the positioning of the apertures for observing the vials and the positioning of the coacting holes for receiving the locking device pins.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed is:

1. An extension level device extendable between a collapsed position and a fully extended position comprising:

an elongated base member having mutually spaced apertures therethrough including a centrally located aperture, the apertures disposed along the longitudinal axis thereof and a spirit level vial mounted in the centrally located aperture thereof;

first and second extension members slidably mounted on opposed longitudinal faces of said base member, the longitudinal axes of said extension members and said base lying in a common plane, each of said members having a plurality of mutually spaced apertures therethrough disposed along the longitudinal axis of each of said members and first and second spirit level vials, said first vial mounted in an aperture in said first member and said second vial mounted in an aperture in said second member;

adjacent apertures in said base and first and second members being spaced longitudinally an equal distance apart and both ends of said base member and one end of each of said first and second members defining half circles having centers lying on the longitudinal axis of said member spaced thereon said equal distance from adjacent apertures;

means carried by said device for permitting only longitudinal movement of said first and second members relative to said base;

locking means carried by said device for releasably coupling said first and second members and said base member against relative longitudinal movement.

2. The device of claim 1 wherein said base member is I-shaped in cross section forming with the outwardly extending portions of said I a pair of rails on either side of said base for slidably receiving said first and second extension members, respectively, therein.

3. The device of claim 2 wherein each of said rails is L-shaped in cross section.

4. The device of claim 3 wherein each of said extension members defines a pair of longitudinal grooves L-shaped in cross section, said grooves slidably receiving a pair of said rails formed by outwardly extending portions of said base member.

5. The device of claim 4 wherein each of said extension members form upper and lower longitudinally extending flanges which overlap at least a portion of the upper and lower surfaces of said base member, said device further comprising guide means carried by said base member and disposed abutting the edge of the overlapping portion of each of said flanges for guiding longitudinal displacement of each of said extension members relative to said base and for maintaining the longitudinal axes of said members and said base in a mutually spaced parallel relationship.

6. The device of claim 5 wherein said guide means comprises upper and lower centrally located ridges on the upper and lower surfaces of said base member, the longitudinal axes of said ridges lying in a vertical plane which contains the longitudinal axis of said base member.

7. The device of claim 6 further comprising first and second hollow block members mounted on an end of each of said first and second extension members at opposite ends of said device, each of said block members adapted to receive an end of said base member and an end of the opposite extension member when said device is in a collapsed position.

8. The device of claim 7 further comprising stop means carried by said device for permitting only longitudinal displacement of an end of each of said first and second members opposite said block members carried thereby a predetermined distance toward the block member carried by the other of said extension members.

9. The device of claim 1 wherein the centers of the half circles and the apertures are spaced a distance of six inches apart.

10. The device of claim 9 wherein the overall length of said device in the collapsed position is 24 inches and in the fully extended position is 48 inches.

* * * * *